United States Patent
Kijima

(10) Patent No.: US 6,784,250 B2
(45) Date of Patent: Aug. 31, 2004

(54) RESIN COMPOSITION FOR CALENDERING AND POLYOLEFIN MATERIAL FOR LEATHER-LIKE ARTICLE

(75) Inventor: Masato Kijima, Chiba (JP)

(73) Assignee: Idemitsu Petrochemical Co., Ltd., Tokyo (JP)

( * ) Notice: Subject to any disclaimer, the term of this patent is extended or adjusted under 35 U.S.C. 154(b) by 0 days.

(21) Appl. No.: 10/276,332

(22) PCT Filed: May 28, 2001

(86) PCT No.: PCT/JP01/04453
§ 371 (c)(1),
(2), (4) Date: Nov. 26, 2002

(87) PCT Pub. No.: WO01/92407
PCT Pub. Date: Dec. 6, 2001

(65) Prior Publication Data
US 2003/0158343 A1 Aug. 21, 2003

(30) Foreign Application Priority Data

May 30, 2000 (JP) ......................................... 2000-160354
Jun. 26, 2000 (JP) ......................................... 2000-190611

(51) Int. Cl.$^7$ .......................... C08L 23/02; C08L 23/10; C08F 4/642; B29C 43/24
(52) U.S. Cl. ....................... 525/191; 525/222; 525/232; 525/240; 525/241; 428/500
(58) Field of Search ................................ 525/191, 222, 525/232, 240, 241; 428/500

(56) References Cited

U.S. PATENT DOCUMENTS

| 5,736,613 A | 4/1998 | Kijima et al. |
| 5,763,501 A | 6/1998 | Bickhardt et al. |
| 5,786,427 A | 7/1998 | Kijima et al. |
| 5,874,505 A | 2/1999 | Saito et al. |
| 6,423,782 B1 | 7/2002 | Yukimasa et al. |

FOREIGN PATENT DOCUMENTS

| EP | 0696616 | 2/1996 |
| EP | 1095951 | 5/2001 |
| EP | 1 286 249 | 3/2003 |
| JP | 8-165382 | 6/1996 |
| JP | 11-286584 | 10/1999 |
| JP | 2000-230086 | 8/2000 |
| WO | 9967303 | 12/1999 |

Primary Examiner—Nathan M. Nutter
(74) Attorney, Agent, or Firm—Oblon, Spivak, McClelland, Maier & Neustadt, P.C.

(57) ABSTRACT

The present invention provides a resin composition for calender formation containing [I] a propylene polymer in an amount of 1 to 99 mass %, and [II] an olefin-based polymer in an amount of 99 to 1 mass %, wherein [I] the propylene polymer satisfies the following requirements of: (1) a meso pentad fraction (mmmm) is 0.2 to 0.6, and (2) a racemic pentad fraction (rrrr) and (1−mmmm) satisfy the following relation: [rrrr/(1−mmmm)]≦0.1. A material for polyolefin-based leather tone product containing a polyolefin resin layer by the use of the resin composition for calender formation is also proposed. According to the resin composition of the present invention, a resin composition for calender formation, a material for polyolefin-based leather tone product being superior in molding ability, being environmentally friendly, with little sticking and being superior in flexibility and transparency are achieved.

26 Claims, No Drawings

RESIN COMPOSITION FOR CALENDERING AND POLYOLEFIN MATERIAL FOR LEATHER-LIKE ARTICLE

TECHNICAL FIELD

The present invention relates to a resin composition used for calender formation, a molded article molded by calender formation with the use of the resin composition, material for a polyolefin-based leather tone product and a leather tone product provided by laminating the material on a substrate.

BACKGROUND ART

A molded article provided by calender formation method is broadly used for farming supplies, parts for home electric appliances/OA equipment, interior or exterior parts in automobiles, parts for residence/building materials, medical application products, foods supplies, packaging supplies in the form of tapes, sheets, films, leathers, etc.

Among the materials that may be used for these applications, soft vinyl chloride resin is broadly used due at least in part to its excellent characteristic such as superior flexibility and deformation recoverability. However, it is known that the vinyl chloride resin generates harmful substance such as hydrogen chloride gas or dioxin during burning process therefore the development of a substitute resin has long been desired. As a substitute resin, a molded article obtained by calender molding a resin composition comprising a specific α-olefin/polyene copolymer and an olefin polymer is disclosed in Japanese Patent Application Laid-Open No. Hei 5-202237. However, the stereoregularity of this resin is as high as 98% and the flexibility of this resin was inferior. Recently, an olefin-based polymer produced by the use of metallocene catalyst, for example, a copolymer of ethylene and α-olefin has been proposed as a substrate resin. However, this copolymer in soft type has a shortcoming of causing sticking components. This resin is also not satisfactory because of poor transparency and poor surface characteristics.

Therefore, the first object of the present invention is to provide a resin composition for calendering and a molded article obtained by calender molding the resin composition which is environmentally friendly, superior in tackiness, softness and transparency and has excellent molding properties.

A leather tone product made by laminating the resin with a cloth, a lumber, a plastic, etc., is preferably used as epidermis materials in applications such as automobile interior materials, furniture, bags, wearing apparels. Polyvinyl chloride-based resin has been employed broadly because of its excellent characteristics such as superior flexibility, and deformation-recovering ability. However, a problem with disposal is that PVC resin generates hydrogen chloride gas or dioxin during incineration. Moreover, concern that a plasticizer used for plasticization of PVC have environmental consequences such as mimicking human hormone. Accordingly, intense development of polyolefin-based resin as alternate material for the polyvinyl chloride-based resin is attempted recently. However, for polyolefin-based resin such as conventional polyethylene or polypropylene, it is necessary to copolymerize or to blend a rubber component in order to obtain the desired flexibility. This blending may lead to tackiness caused by a low molecular weight component and a copolymerization component, and may lead to transparency or texture (the feel) degradation.

Therefore, to improve the foregoing problems in the leather tone product, the second object of the present invention is to provide a material for polyolefin-based leather tone product having excellent molding ability, easiness in recycling, a little risk of generating toxic gases such as hydrogen chloride gas or dioxin during disposal or incineration, environmental friendliness, little tackiness, superiority in softness, transparency and texture, and to provide a leather tone product obtained by laminating the material on a substrate.

DISCLOSURE OF THE INVENTION

The present invention was completed by zealously investigating and finding that a specific resin composition comprising specific propylene polymer and olefin-based polymer achieves the first and the second objects of the invention. Accordingly, the present invention provides a resin composition used for calender formation, a molded article molded by calender formation with the use of the resin composition, a material for a polyolefin-based leather tone product and a leather tone product provided by laminating the material on a substrate as the following:

[1] A resin composition for calender formation comprising [I] a propylene polymer in an amount of 1 to 99 mass %, and [II] an olefin-based polymer in an amount of 99 to 1 mass %, wherein [I] the propylene polymer satisfies the following requirements of:
(1) a meso pentad fraction (mmmm) is from 0.2 to 0.6: and
(2) a racemic pentad fraction (rrrr) and (1−mmmm) satisfy the following relation:

$[rrrr/(1-mmmm)] \leq 0.1.$

[2] The resin composition for calender formation as defined in the item [1], wherein [I] the propylene polymer satisfies the following requirement of:
(3) an intrinsic viscosity [η] measured at 135° C. in tetralin is from 1.0 to 3.0 deciliter/g.

[3] The resin composition for calender formation as defined in the item [1] or the item [2], wherein [I] the propylene polymer satisfies the following requirement of:
(4) an amount of a component which is eluted at 25° C. or lower through temperature rise chromatography (W 25) is from 20 to 100 mass %.

[4] The resin composition for calender formation according to any one of the items [1], [2] or [3], wherein [I] the propylene polymer is polymerized by the use of a metallocene catalyst containing a promoter and a transition metallic compound in which a cross-linking structure is formed via two cross-linking groups.

[5] The molded article provided by calender molding the resin composition for calender formation according to any one of the items [1], [2], [3] or [4].

[6] A material for polyolefin-based leather tone product containing a polyolefin resin layer comprising the resin composition for calender formation according to any one of the items [1], [2], [3] or [4].

[7] A leather tone product provided by laminating the material for polyolefin-based leather tone product according to the item [6] on a substrate.

THE MOST PREFERRED EMBODIMENT TO CARRY OUT THE INVENTION

The present invention provides a resin composition for calender formation comprising [I] a specific propylene polymer in an amount of 1 to 99 mass % and [II] an olefin-based polymer in an amount of 99 to 1 mass %, a molded resin molded by calender formation with the use of the resin composition, material for a polyolefin-based leather tone product including a polyolefin resin layer with the use of the resin composition and a leather tone product provided by laminating the material on a substrate. The present invention shall be explained below in further details.

Resin Composition

The [I] specific propylene polymer employed for the present invention satisfies the following requirements of:

(1) a meso pentad fraction (mmmm) is from 0.2 to 0.6: and (2) a racemic pentad fraction (rrrr) and (1−mmmm) satisfy the following relation:

$$[rrrr/(1-mmmm)] \leq 0.1.$$

Although the present invention requires that the propylene polymer satisfies (1) and (2) above, the meso pentad fraction (mmmm) is desirable to be 0.3–0.6 and more desirable to be 0.4–0.5. Additionally, the relation between the racemic pentad fraction (rrrr) and (1−mmmm) is desirable to be [rrrr/(1−mmmm)]≦0.08, more desirable to be [rrrr/(1−mmmm)]≦0.06 and the most desirable to be [rrrr/(1−mmmm)]≦0.05.

When [I] the propylene polymer satisfies the foregoing relation, the obtained calender molded article and the material for polyolefin-based leather tone product will be well balanced in tackiness, low elastic modulus and transparency. In other words, the obtained calender molded article and the material for polyolefin-based leather tone product have advantages in the low elastic modulus, the superior in softness (or flexibility), low tackiness, excellent surface characteristics (for example, little bleed and little migration of the sticking component to other product, etc.), clear transparency and various coloring or diverse color enabled by combination of pigments.

The meso pentad fraction (mmmm) of the propylene polymer less than 0.2 causes sticking. When the meso pentad fraction of the propylene polymer (mmmm) exceeds 0.6, it is not desirable because the elastic modulus becomes large. The [rrrr/(1−mmmm)] of the propylene polymer more than 0.1 causes sticking.

The meso pentad fraction (mmmm fraction) in the present invention is obtained by means of a method proposed in "Macromolecules, 6, 925 (1973)" by A. Zambelli, et al., and is defined as a meso fraction in pentad unit among polypropylene molecular chain measured on the basis of the signal attributed to the methyl group in the $^{13}$C-NMR spectrum. Large meso pentad fraction means high stereoregularity of the propylene polymer. Similarly, the racemic pentad fraction (rrrr fraction) is defined as a racemic fraction in pentad unit among polypropylene molecular chain. The value [rrrr/(1−mmmm)] is obtained by the fraction in pentad unit and exists as an indicator expressing uniformity of stereoregularity distribution of propylene polymer. When the [rrrr/(1−mmmm)] value becomes large, it means that stereoregularity distribution expands, and that mixture of high stereoregular polypropylene (PP) and atactic polypropylene (APP) like the conventional polypropylene produced with using existing catalyst system is prepared with increased sticking and degraded transparency. Further, the measurement $^{13}$C-NMR spectrum is conducted in accordance with peak attribution proposed in "Macromolecules, 8, 687 (1975)" by A. Zambelli, et al., with the following apparatus and under the following condition.

Apparatus: "JNM-EX400 Model $^{13}$C-NMR spectrometer" produced by JEOL Ltd.
Method: Complete proton decoupling method
Concentration: 220 mg/milliliter
Solvent: A mixed solvent of 1,2,4-trichlorobenzene and bi-benzene with mass ratio of 90:10.
Temperature: 130° C.
Pulse width: 45°
Pulse interval: 4 seconds
Integration: 10,000 times Regarding the propylene polymer of the present invention, beside the foregoing requirement, (3) an intrinsic viscosity [η] measured at 135° C. in tetralin is desirable to be 1.0–3.0 deciliter/g. The intrinsic viscosity [η] is more desirable to be 1.0–2.5 deciliter/g and particularly desirable to be 1.1–2.2 deciliter/g. When the intrinsic viscosity [η] is less than 1.0 deciliter/g, sticking may occur. When the intrinsic viscosity exceeds 3 deciliter/g, the polymer has a poor molding ability due to deteriorated fluidity.

Furthermore, besides the foregoing requirements (1), (2) and (3), the propylene polymer of the present invention may be preferable to satisfy that (4) an amount of a component which is eluted at 25° C. or lower through temperature rise chromatography (W25) is from 20 to 100 mass %. The amount of eluted component at 25° C. or lower (W 25) is desirable to be from 30 to 100 mass %, more desirable to be from 50 to 100 mass % and the most desirable to be from 60 to 100 mass %. The term "W25" is defined as the amount of an eluted component (mass %) which is not adsorbed onto a filler at the column temperature of 25° C. on TREF column obtained on the basis of an elution curve prepared by temperature rise chromatography according to operation method, apparatus constitution and measurement condition described below in EXAMPLES. W25 is an index for expressing whether the propylene polymer is soft or not. Large value of W25 means that the polymer contains many components of low elastic modulus and/or that non-uniformity of stereoregularity distribution extends. In the present invention, when W25 is less than 20%, it may be unfavorable because the polymer loses flexibility.

The propylene polymer of the present invention is preferable to be further satisfying any one of the following requirements (a) to (d).

(a) The polymer preferably has a molecular weight distribution (Mw/Mn) of 4.0 or less, more preferably 3.5 or less and the most preferably 3.0 or less as measured by gel permeation chromatography (GPC). When the molecular weight distribution (Mw/Mn) exceeds 4.0, the polymer tends to become sticky. The Mw/Mn is measured by gel permeation chromatography (GPC) method described below in EXAMPLES.

(b) A melting endothermic amount ΔH obtained by a differential scanning calorimeter (DSC) measurement of the polymer is preferable to be 30 J/g or less because the polymer becomes superior in flexibility. In the present invention, the value ΔH is an index to express whether the polymer is soft or not, and large value of the index means that the polymer has a high elastic modulus and poor flexibility.

(c) A melting point (Tm) and a crystallization temperature (Tc) may be either present or absent, but they are preferably absent from the viewpoint of flexibility. It is desirable particularly to have a low melting point (Tm) of 100° C. or lower. With regards to the values of ΔH, Tm and Tc, they are determined according to DSC measurement described below in EXAMPLES.

(d) A tensile elastic modulus of the polymer is desirable to be 100 MPa or less and more desirable to be 70 MPa or less. The propylene polymer used in the present invention may be accepted by satisfying both the foregoing (1) and (2), and may be accepted by further copolymerizing 2 mass % or less of comonomer of other than propylene as far as without departing from the object of the present invention. Examples of the comonomer include ethylene, 1-butene, 1-pentene, 4-methyl-1-pentene, 1-hexene, 1-octene, 1-decene, 1-dodecen, 1-tetradecene, 1-hexadecene, 1-octadecene, 1-eicosen, etc. These comonomers may be used alone or in combination of two or more in the present invention.

As a production method for [I] the propylene polymer used for this invention, polymerization or copolymerization of the propylene employing the metallocene catalyst obtained by combining (A) transition metal compound having cross-linking structure formed via two cross-linking groups with (B) a promoter together is preferable. Specifically, [I] the propylene polymer used in the present invention is preferably produced through a method in which polymerization of propylene or copolymerization of propylene, in the presence of a polymerization catalyst containing (A) transition metallic compound and (B) a promoter component selected from among (B-1) a compound capable of forming an ionic complex through reaction with (A) the transition metallic compound or a derivative thereof and (B-2) an aluminoxane, (A) the transition metallic compound being represented by the following general formula (I).

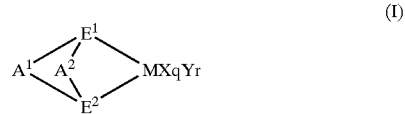

wherein M represents a metal element of Groups 3 to 10 of the Periodic Table or lanthanum series; $E^1$ and $E^2$ are the same or different and each independently is a ligand selected from the group consisting of substituted cyclopentadienyl, indenyl, substituted indenyl, heterocyclopentadienyl, substituted heterocyclopentadienyl, amido, phosphide, hydrocarbyl and silicon-containing group; and $E^1$ and $E^2$ are crosslinked via $A^1$ and $A^2$; X is a σ-bonding ligand; and a plurality of X, if any, may be same or different and each X may be cross-linked with another X, $E^1$, $E^2$ or Y; Y is a Lewis base; and a plurality of Y, if any, may be same or different and each Y may be cross-linked with another Y, $E^1$, $E^2$ or X; $A^1$ and $A^2$ may be the same or different divalent group for cross-linking two ligands $E^1$ and $E^2$ and each independently is hydrocarbon group having 1 to 20 carbon atoms, halogen-containing hydrocarbon group having 1 to 20 carbon atoms, silicon-containing group, germanium-containing group, tin-containing group, —O—, —CO—, —S—, —SO$_2$—, —Se—, —NR$^1$—, —PR$^1$—, —P(O)R$^1$—, —BR$^1$— or —AlR$^1$— wherein $R^1$ is hydrogen, halogen, hydrocarbon group having 1 to 20 carbon atoms or halogen-containing hydrocarbon group having 1 to 20 carbon atoms; q is an integer of 1 to 5 given by the formula: [(valence of M)−2]: and r is an integer of 0 to 3.

Operative examples of transition metal compound expressed by general formula (I) include (1,2'-dimethylsilylene) (2,1'-dimethylsilylene) bis (3-n-butyl indenyl) zirconium dichloride(1,2'-dimethylsilylene)(2,1'-dimethylsilylene), bis(3-trimethylsilylmethyl indenyl) zirconium dichloride(1,2'-dimethylsilylene) (2,1'-dimethylsilylene), bis(3-phenyl indenyl) zirconium dichloride, (1,2'-dimethylsilylene)(2,1'-dimethylsilylene)bis (4,5-benz indenyl) zirconium dichloride (1,2'-dimethylsilylene)(2,1'-dimethylsilylene), bis(4-isopropyl indenyl) zirconium dichloride(1,2'-dimethylsilylene)(2,1'-dimethylsilylene), bis(5,6 dimethyl indenyl) zirconium dichloride(1,2'-dimethylsilylene)(2,1'-dimethylsilylene), bis (4,7-di-i-propy lindenyl) zirconium dichloride(1,2'-dimethylsilylene)(2,1'-dimethylsilylene), bis(4-phenyl indenyl) zirconium dichloride(1,2'-dimethylsilylene) (2,)1'-dimethylsilylene) bis(3-carbinyl-4-i-propyl indenyl) zirconium dichloride(1,2'-dimethylsilylene)(2,1'-dimethylsilylene), bis(5,6-benz indenyl) zirconium dichloride (1,2'-dimethylsilylene)(2,1'-isopropylidene), bis (indenyl) zirconium dichloride (1,2'-dimethylsilylene)(2,1'-isopropylidene), bis(3-carbinyl indenyl) zirconium dichloride (1,2'-dimethylsilylene)(2,1'-isopropylidene), bis(3-i-propyl indenyl) zirconium dichloride(1,2'-dimethylsilylene) (2,1'-isopropylidene), -bis(3-n-butyl indenyl) zirconium dichloride (1,2'-dimethylsilylene)(2,1'-isopropylidene), bis (3-trimethylsilylmethyl indenyl) zirconium dichloride, etc. and these substituted chemical compound employing titanium or hafnium instead of zirconium.

Next, examples of (B-1) component among component (B) include tetraphenyl boron triethoxide ammonium, tetraphenyl boric acid tri-n-butylammonium, tetraphenyl methyl borate ammonium, tetraphenyl boric acid tetraethylammonium, tetraphenyl methyl borate (tri-n-butyl) ammonium, tetraphenyl boric acid benzil (tri-n-butyl) ammonium, etc. The (B-1) component may be used alone or in combination of two or more kinds thereof.

On the other hand, examples of aluminoxanes as (B-2) component include methylaluminoxane, ethylaluminoxane, butylaluminoxane, etc. These aluminoxanes may be used alone or in combination of two or more.

The polymerization catalyst used in the present invention may further contain, in addition to the components (A) and (B), an organoaluminum compound as the component (C). Examples of the organoaluminum compound as the component (C) include trimethylaluminum, triethylaluminum, triisopropylaluminum, triisobutylaluminum, dimethylaluminum chloride, diethylaluminum chloride, methylaluminum dichloride, ethylaluminum dichloride, dimethylaluminum fluoride, diiusobutylaluminum hydride, diethylaluminum hydride, and ethylaluminum sesquichloride. These organoaluminum compounds may be used alone or in combination of two or more.

In the polymerization of the propylene, at least one of the catalyst components may be carried on a suitable support. Polymerization method is not particularly limited and any one of slurry polymerization method, vapor phase polymerization method, bulk polymerization method, solution polymerization method, suspension polymerization method, etc. is applicable, however, bulk polymerization method or solution polymerization method is particularly desirable.

Polymerization temperature is usually from −100° C. to 250° C. The molar ratio of the starting monomer or monomers to the component (A) is preferably 1 to $10^8$, more preferably 100 to $10^5$. Furthermore, the polymerization time is usually 5 minutes to 10 hours, and the polymerization reaction pressure is usually from ambient pressure to 20 MPa (gauge).

Next, examples of [II] the olefin-based polymer used for this invention include polypropylene, propylene-ethylene copolymer, propylene-ethylene-diene copolymer, polyethylene, ethylene/α-olefin copolymer, ethylene-vinyl acetate copolymer, hydrogenated styrene-based elastomer, etc. They may be used alone or in combination of two or more kinds thereof.

A resin composition used for calender formation and used for a polyolefin resin layer for a material for a polyolefin-based leather tone product in the present invention comprises [I] the propylene polymer in an amount of 1 to 99 mass % and [II] the olefin-based polymer in an amount of 99 to 1 mass %. Preferably it comprises [I] the propylene polymer in an amount of 10 to 80 mass % and [II] the olefin-based polymer in an amount of 90 to 20 mass %. More preferably it comprises [I] the propylene polymer in an amount of 25 to75 mass % and [II] the olefin-based polymer in an amount of 75 to 25 mass %. In particular, that it comprises [I] the propylene polymer in an amount of 40 to 75 mass % and [II] the olefin-based polymer in an amount of 60 to 25 mass % is desirable.

A resin composition used for calender formation and used for a polyolefin resin layer for a material for a polyolefin-based leather tone product in the present invention is produced by dry-blending [I] the propylene polymer in an amount of 1 to 99 mass %, [II] the olefin-based polymer in an amount of 99 to 1 mass % and optional additives with the use of a Henschel mixer, etc. and by melt-kneading them with single or double-screw extruder, a Banbery mixer, etc. Examples of the optional additives include softening agents, inorganic fillers, pigments, blister agents, fire retardants and nucleating agents.

A Calender-molded Article

A calender-molded article of the present invention is provided by calender molding the foregoing resin composition. A calender molding generally means a molding method where a softened resin is rolled between two or more rollers into film or sheet having a definite thickness. This method can employ conventionally known apparatus under known molding conditions. Examples of the calendering apparatus include in-line calender, L-calender, inverted L-calender, Z-calender, etc. The calendering may be carried out under conditions of a resin temperature of 80° C. to 300° C. The calender molded article of the present invention is preferably produced by calendering at a resin temperature of 100° C. to 300° C., more preferably 120° C. to 280° C.

The calender-molded article may be formed into artificial leather, waterproof cloth or various laminates by feeding the resin together with unwound film, paper or cloth. The application fields of the calender-molded article of the present invention may include films, sheets and specifically, artificial leather, waterproof cloth and various laminates, car components (such as interior trims), domestic electric appliances (such as inner lining of refrigerator), etc., but they are not particularly restricted.

The calender-molded article of the present invention has advantages in easiness in recycle, a little fear to generate toxic gas in disposal or in incineration and environmentally friendly. In addition, it has superiority in softness (or flexibility), high elastic recovery rate (the character of recovering after being tensioned), little sticking and clear transparency in spite of it's softness or it's low tensile elastic modulus.

A Material for Polyolefin-based Leather Tone Product

The material for polyolefin-based leather tone product of the present invention has advantages in molding ability and in little sticking, and is superior in softness, transparency and texture. The polyolefin resin layer for the material for polyolefin-based leather tone product may be foamed usually from 1.1 to 10 times as much as it and preferably from 1.1 to 6 times as much as it. The foaming may be conducted by employing publicly known technology, for example, an approach using thermal decomposition type blister agent described in Japanese Patent Application Laid-Open No. 2000-79659. The thickness of the polyolefin resin layer is preferable to be 100–2,000 μm, and more preferable to be 150–1,000 μm.

The material for polyolefin series leather tone product of the present invention contains the foregoing polyolefin resin layer and optionally another layer(s) to form a multilayer product depending on necessity. Examples of the multilayer product include a combination of the polyolefin resin layer, a polyurethane layer or the foregoing foamed polyolefin resin layer. The polyurethane layer may comprise polyurethane resin with no limitation in particular. Examples of the polyurethane resin include publicly known resins such as reaction product of reacting organic diisocyanate and polyol in a solvent or the product having optionally extended chain length with diamine. Examples of the isocyanate component include aromatic diisocyanate, aliphatic diisocyanate such as tolylene 2,4-diisocyanate or 4,4'-diphenyl-methane diisocyanate, etc. Examples of the polyol component include polyetherpolyol, polyester polyol such as polyethylene glycol, polypropylene glycol, etc. In addition, examples of polyester polyol include ethylene glycol, reaction product of diol such as propylene glycol and diacid base such as adipic acid or sebacic acid, ring opening polymer such as caprolactone, phosgene of polyol, polycarbonate diol compound synthesized by means of transesterification with diphenyl carbonate, etc.

The polyurethane layer is typically a polyurethane film and preferably formed with applying the foregoing polyurethane resin to a release coated paper by any one of knife coating formation method, inflation molding method, T-die extrusion formation method, calender formation method and gravure coating method. The polyurethane layer is preferable to have a thickness of 1–300 μm, a rubber hardness of 50 degrees or more in JIS-A expression and/or a flexibility of 1 MPa or more in 100% modulus. It is more preferable to have a thickness of 3–300 μm, a rubber hardness of from 50 degrees to 100 degrees in JIS-A expression and/or a flexibility of from 2 to 30 MPa in 100% modulus. The polyurethane layer may be made of elastomer of polyurethane. In addition, the polyurethane layer may be foamed.

The material for leather tone product of the present invention is preferable to be formed by laminating the polyolefin resin layer and the polyurethane layer via an adhesive layer. Regarding the adhesive layer, it is particularly preferable to include isocyanate-based adhesive, acrylic adhesive, epoxy-based adhesive, modified polyolefin adhesive, etc.

A surface coat layer may be further applied to the material for leather tone product of the present invention. A feeling of touch the surface becomes still more favorable by applying the surface coat layer. The thickness of the surface coat layer is usually 1–30 μm and preferable to be 1–10 μm. The surface coat layer may be made of urethane resin and/or acryl resin. The foregoing examples of the urethane resin are used for the surface coat layer. Further, those resin having acrylic acid and the ester, acrylamide, acrylonitrile, methacrylic acid and homopolymer of the ester or copolymer of these and another acrylate or vinyl monomer as a main component are used as the acrylic resin.

Examples of the ester of acrylic acid include methylacrylate, ethylacrylate, butylacrylate, 2-ethylhexyl acrylate, cyanomethyl acrylate, cyanoethyl acrylate, cyano butylacrylate, cyano-2-ethylhexyl acrylate, etc. Examples of the ester of methacrylic acid include methyl methacrylate, ethyl meta acrylate, butyl meta acrylate, 2-ethylhexyl meta acrylate, cyanomethyl meta acrylate, cyanoethyl meta acrylate, cyano butyl meta acrylate, cyano-2-ethylhexyl meta acrylate, etc. Further, a mixture or a copolymer of urethane and acrylic acid may be used for the surface coat layer. A silicone series chemical agent, etc. may be optionally added to the foregoing urethane resin and/or acryl resin.

Regarding the material for leather tone product of the present invention, it is preferable that the polyurethane layer and/or the surface coat layer contain fine powders of natural organic substance. As the fine powders of natural organic substance, silk, cellulose, collagen, wool, ceratin, hemp, cotton, chitin, chitosan, betaine, eggshell membrane, etc. can be employed. In addition, two or more kinds of these powders may be employed in combination. The content of the fine powders of natural organic substance is normally 1–90% by weight, preferably 3–60% by weight and, in particular, more preferably 5–30% by weight. Containment of the fine powders of natural organic substance is favorable because it gives good feeling of touch, superior hygroscopic property and superior moisture permeability to the product. Regarding the particle size of the fine powders of natural organic substance, the average particle diameter measured with laser diffraction/dispersion type particle size distribution measuring apparatus LMS-24 produced by Seishin company Co., Ltd. is 300 $\mu$m or less, preferably 1–100 $\mu$m, and more preferably 3–30 $\mu$m. When the average particle diameter exceeds 300 $\mu$m, a comfortable feeling of touch would not necessarily be expected for the product.

Regarding a manufacturing method of the material for leather tone product, there is no limitation in particular, and one example of the manufacturing method is as the following:

(1) Melt-kneading the polyolefin resin with apparatus having twin rollers, a sheet of polyolefin resin is obtained by adjusting thickness, (2) optionally blending the fine powders of natural organic substance in a polyurethane solution in a manner they are dispersed uniformly, (3) obtaining a polyurethane film by applying the polyurethane solution to a release coated paper with a knife coater, and (4) producing a material for leather tone product by laminating the polyurethane film onto the sheet of polyolefin resin using dry-laminate method.

A Leather Tone Product

A leather tone product of the present invention is an article provided by laminating the material for leather tone product on a substrate. As the substrate, cloths, woods, plastics, etc. are employed. Specific examples of the cloths include various textile comprising such as cotton, staple fiber, rayon, polyester, Vinylon, polypropylene, polyethylene, and these mix spinning, knit fabric and nonwoven fabric. The woods may be natural or plywood without any limitation with regards to it's configuration, etc. Examples of the plastic include thermoplastics and thermosetting plastics in the shape of sheet, film, etc. In these plastics, various additives such as filler, plasticizer, stabilizer and other secondary material or reinforcer such as glass fiber may be added if necessary. In addition, these plastics may be foamed. Further, the substrate may be optionally provided various surface processes.

An adhesive may or not may be used in laminating the material for leather tone product to the substrate. For example, a heat welding (or a hot laminate) may be adopted for the laminating. The adoption of the adhesive or the heat welding can be appropriately selected depending on the substrate. In addition, a crimp pattern or a stitch pattern may be optionally applied to the leather tone product of the present invention.

Concrete examples of the leather tone product in the field of automobiles, for example, include inner decorative covering materials for instrument panel, console box, armrest, headrest, door trim, rear panel, pillar trim, sun visor, trunk compartment trim, trunk lid trim, air bag storing box, sheet buckle, head liner, globe box, steering wheel cover, ceiling materials, etc. and covering materials for car interior parts such as kicking plate and gearshift boot.

Concrete examples of the leather tone product in the field of home electric appliances or office automation equipments include decorative covering materials for televisions, videorecorders, washing machines, drying machines, cleaning machines, room-coolers, air conditioners, remote control cases, microwave ovens, toasters, coffee makers, pots, jars, dishwashers, electric razors, hair dryers, microphones, headphones, beauty apparatuses, CD/cassette storing boxes, personal computers, typewriters, projectors, telephones, copying machines, facsimiles, telexes, etc.

Concrete examples of the leather tone product in the field of sporting equipment include gloves for ski, gloves for baseball, decorating parts for sports shoes, decorative covering materials for a grip of sports goods such as rackets of various ball games and for a saddle or a handle grip of bicycle, two-wheel barrows and three wheel vehicles.

Concrete examples of the leather tone product in the field of building and residence include decorative covering materials for furniture, desks, chairs, gates, doors, fences, etc., wall decoration materials, ceiling decoration materials, decorative covering materials for curtain wall, indoor type floor materials for kitchen, washroom, rest rooms, etc., outdoors floor materials for verandah, terrace, balcony, carports, etc., and decorative covering materials for entrance matte, table cloth, glass coaster, ashtray coaster, etc.

Concrete examples of the leather tone product in the field of industrial products include decorative covering materials for grips of electrically operated tools, hoses and packing materials. Other examples of the leather tone product include decorative covering materials for bags, cases, files, notebooks, albums, stationeries, camera bodies, dolls and other amusement devices, or molded articles such as watchbands and frames for pictures.

The material for polyolefin-based leather tone product and the leather tone product of the present invention can be easily incinerated or recycled after disposal because they do not contain harmful plasticizer.

EXAMPLES

The present invention shall be explained below in further details with reference to examples, but the present invention shall by no means be restricted by the following examples.

Production of Propylene Polymer (P1)

(1) Synthesis of Complex

Synthesis of (1,2'-dimethylsilylene)(2,1'-dimethylsilylene)-bis(3-trimethylsilylm ethylindene)

In 50 milliliter of THF placed in a Schlenk bottle, 3.0 g (6.97 millimole) of a lithium salt of (1,2'-dimethylsilylene) (2,1'-dimethylsilylene)-bis(indene) was dissolved and the resultant solution was cooled to –78° C. After slowly dropping 2.1 milliliter (14.2 millimole) of iodomethyltrimethylsilane, the solution was stirred at room temperature for 12 hours. The solvent was removed by distillation and 50 milliliter of ether was added to the residue, followed by washing with a saturated ammonium chloride solution. By drying an organic phase after a phase separation of the residue and removing the solvent, 3.04 g (5.88 millimole) of (1,2'-dimethylsilylene) (2,1'-dimethylsilylene)-bis(3-trimethylsilylm ethylindene) was obtained (yield: 84%).

Then, 3.04 g (5.88 millimole) of (1,2'-dimethylsilylene) (2,1'-dimethylsilylene)-bis(3-trimethylsilylm ethylindene) prepared above and 50 milliliter of ether were charged under a nitrogen flow into a Schlenk bottle. The resultant solution was cooled to −78° C., added with 7.6 milliliter (11.7 millimole) of a 1.54 M solution of n-BuLi in hexane, and then stirred at room temperature for 12 hours. After removing the solvent by distillation, the solid product was washed with 40 milliliter of hexane to obtain 3.06 g (5.07 millimole) of a lithium salt as ether adding product (yield: 73%).

The result of measurement by $^1$H-NMR (90 MHz, THF-d8) were δ0.04 (s, 18H, trimethylsilyl), 0.48 (s, 12H, dimethylsilylene), 1.10 (t, 6H, methyl), 2.59 (s, 4H, methylene), 3.38 (q, 4H, methylene), 6.2–7.7 (m, 8H, Ar—H).

The lithium salt was dissolved in 50 milliliter of toluene under nitrogen flow. After cooling to −78° C., a suspension, which was cooled to −78° C. in advance, 1.2 g (5.1 millimole) of zirconium tetrachloride in 20 milliliter of toluene was added dropwise to the solution. After completion of addition, the resultant mixture was stirred at room temperature for 6 hours and then filtered. The residue was recrystallized from dichloromethane to obtain 0.9 g (1.33 millimole) of (1,2'-dimethylsilylene)(2,1'-dimethylsilylene)-bis(3-trimethylsilylmethylindenyl)zirconium dichloride (yield: 26%).

The result of measurement by $^1$H-NMR (90 MHz, CDCl$_3$) were δ0.0 (s, 18H, trimethylsilyl), 1.02, 1.12 (s, 12H, dimethylsilylene), 2.51 (dd, 4H, methylene), 7.1–7.6 (m, 8H, Ar—H).

(2) Polymerization of Propylene

A stainless steel autoclave with a capacity of 10 liter and having an agitator sequentially received 4 liter of n-heptane, 2 millimole of triisobutylaluminium, 2 millimole of methylaluminoxane (available from Albemarle Corp.) and 2 μmole of (1,2'-dimethylsilylene) (2,1'-dimethylsilylene)-bis(3-n-butylindenyl) zirconium dichloride obtained above. Then, after introducing hydrogen up to 0.06 MPa (gauge), a propylene gas was introduced into the autoclave to get the total pressure of 0.8 MPa (gauge) while raising the temperature up to 60° C. In the polymerization, the propylene was continuously fed into the autoclave though a pressure controller until the total pressure reached 0.8 MPa (gauge). After continuing the polymerization at 60° C. for 30 minutes, the reaction mixture was taken out and dried under reduced pressure to obtain a propylene polymer (P1). The results of evaluation according to the following "Evaluation method of resin characteristic of propylene polymer" are shown in Table 1.

"Evaluation Method of Resin Characteristic of the Propylene Polymer"

(1) Measurement of [η]

An intrinsic viscosity [η] of the polymer was measured at 135° C. in tetralin using an automatic viscometer "VMR-053 Model" produced by Rigosha Co., Ltd.

(2) Measurement of a Pentad Fraction

A pentad fraction was measured by the method described above in the description.

(3) Measurement of a Melt Flow Rate (MFR)

A MFR was measured at 230° C. and under weighted load of 21.18 N according to JIS K7210.

(4) Measurement of a Molecular Weight Distribution (Mw/Mn)

A Mw/Mn was measured by the use of apparatus described below.

GPC Apparatus

Column: TOSO GMHHR-H(S)HT

Detector: RI Detector for liquid chromatogram "WATERS 15° C."

Measurement Condition

Solvent: 1,2,4-trichlorobenzene

Measuring temperature: 145° C.

Flow velocity: 1.0 milliliter/minute

Sample concentration: 2.2 mg/milliliter

Injection amount: 160 microliter

Calibration curve: Universal Calibration

Analytic program: HT-GPC (Ver.1.0)

(5) DSC Measurement

A differential scanning calorimeter ("DSC-7" produced by Perkin Elmer Co., Ltd.) was used. After melting 10 mg sample by heating at 220° C. for 3 minutes in nitrogen atmosphere, the sample was cooled to −40° C. at a cooling rate of 1° C./minute. The peak top of the maximum peak of the crystallization exothermic curve was defined as the crystallizing point Tc (° C.). The cooled sample was kept at −40° C. for 3 minutes, and then heated at a temperature rising rate of 10° C./minute to obtain a melting endothermic curve. A melting endothermic amount was expressed as ΔH. The peak top of the maximum peak of the melting endothermic curve was taken as the melting point Tm (° C.).

(6) Temperature Rise Fractionation Chromatograph

According to the following procedure, W 25, an amount of eluted component (mass %) without being adsorbed onto a filler at the column temperature of 25° C. on TREF in an elution curve was obtained.

(a) Operation Method

Introducing a sample solution into the TREF column regulated at a temperature of 135° C., subsequently cooling down to 0° C. with cooling velocity of 5° C./hour by degrees, holding at 0° C. for 30 minutes so that the sample is adsorbed onto the filler. Then, elevating the temperature of the column up to 135° C. with temperature rising rate of 40° C./hour, the elution curve can be obtained.

(b) Apparatus Constitution

TREF column: Silicagel column (4.6φ×150 mm) produced by GL Science Company

Flow cell: K Br cell (optical light path length: 1 mm) produced by GL Science Company Liquid feeding pump: SSC-3100 pump produced by Senshuu Science Company Valve oven: MODEL554 oven (high-temperature type) produced by GL Science Company TREF oven: produced by GL Science Company Dual system temperature controller: REX-C100 temperature controller produced by Rigaku Kogyou Company Detector: Infrared detector for liquid chromatography MIRAN 1A CVF produced by FOXBORO Company Ten way valve: Electric valve produced by Baluko Company Loop: 500 microliter loop produced by Baluko Company (c) Measuring Conditions Solvent: o-dichlorobenzene Sample concentration: 7.5 g/liter Injection amount: 500 microliter Pumping rate: 2.0 milliliter/minute Detection wave number: 3.41 μm Column filler: Chromosorb P (30 to 60 mesh)

Column temperature distribution: within ±0.2° C.

Production of Propylene Polymer (P2)

(1) Preparation of Magnesium Compound

A 6-liter glass reactor equipped with a stirrer was fully purged with nitrogen gas, and then charged with about 2,430 g of ethanol, 16 g of iodine and 160 g of metallic magnesium. The mixture was heated under stirring and the reaction was continued under reflux until the generation of hydrogen gas was no longer noticed, thereby obtaining a solid product.

The reaction liquid containing the solid product was dried under reduced pressure to obtain a magnesium compound.

(2) Preparation of a Solid Catalyst Component (A)

A 5-liter glass reactor was fully purged with nitrogen gas, and then charged with 160 g of the magnesium compound (not ground) prepared in Step 1, 80 milliliter of purified heptane, 24 milliliter of silicon tetrachloride, and 23 milliliter of diethyl phthalate. Then, 770 milliliter of titanium tetrachloride was added to the mixture with stirring while keeping the mixture at 80° C., and the reaction was allowed to proceed at 110° C. for 2 hours. The resulting solid component was separated and washed with purified heptane at 90° C. The reaction was further allowed to proceed by adding 1,220 milliliter of titanium tetrachloride at 110° C. for 2 hours. The product was fully washed with purified heptane to obtain a solid catalyst component (A).

(3) Vapor Phase Polymerization of Propylene

The polymerization was conducted at 70° C. under 2.75 MPa (Gauge) by feeding the solid catalyst component (A) prepared in Step 2 at a rate of 6.0 g/hour, triisobutylaluminum (TIBA) at a rate of 0.2 mole/hour, 1-allyl-3,4-dimethoxybenzene (ADMB) at a rate of 0.012 mole/hour, cyclohexylmethyldimethoxysilane (CHMDMS) at a rate of 0.012 mole/hour, and propylene at a rate of 37 kg/hour into a 200-liter polymerization reactor. The powdery polypropylene was blended with 2,5-dimethyl-2,5-di-(tert-butylperoxy)-hexane, and then prescribed with the following additives. After compounding the following additives, the propylene homopolymer was extruded into pellets through a single-screw extruder "TLC 35-20 Model" produced by Tsukada Juki Seisakusho Co., Ltd.

The results of evaluation with regard to the prepared pellets (P2) according to the foregoing "Evaluation method of resin characteristic of propylene polymer" are shown in Table 1.

Additive Prescription (a) Phenol-based Anti-oxidant

Irganox 1010 available from Ciba Specialty Chemicals Corp.: 1000 ppm (b) Phosphorus-based Anti-oxidant P-EPQ: 500 ppm (c) Neutralizer Calcium stearate: 500 ppm (d) Neutralizer:

DHT-4A: 500 ppm

Production of Propylene Polymer (P3)

A stainless steel autoclave with a capacity of 1 liter received 400 milliliter of heptane, 0.5 millimole of triisobutylaluminium, 2 micromole of dimethyl anilinium (pentafuluorophenyl) borate and a catalyst component provided by preparedly contacting with toluene for five minutes with 1 micromole of (the third grade butylamide) dimethyl (tetramethyl-η5-cyclopentadienyl) silane titanium dichloride prepared as Example 1 of Japanese Patent Application Laid-Open No. Hei 3-163088. After introducing hydrogen up to 0.03 MPa (Gauge), a propylene gas was introduced into the autoclave until the total pressure reached 0.8 MPa (Gauge). Propylene was continuously fed into the autoclave though a pressure controller to maintain the polymerization pressure constant. After continuing the polymerization at 70° C. for 1 hour, the reaction mixture was taken out and dried under reduced pressure to obtain a propylene polymer (P3). The results of evaluation with regard to the prepared propylene polymer (P3) according to the foregoing "Evaluation method of resin characteristic of propylene polymer" are shown in Table 1.

TABLE 1

| Resin Property | P1 | P2 | P3 |
|---|---|---|---|
| [η] (deciliter/g) | 1.5 | 2.1 | 1.9 |
| mmmm | 0.45 | 0.57 | 0.02 |
| rrrr | 0.024 | 0.09 | 0.108 |
| rrrr/(1-mmmm) | 0.04 | 0.21 | 0.11 |
| W25(mass %) | 91 | 30 | 91 |
| MFR(g/10 minutes) | 6 | 2 | 2 |
| Mw/Mn | 2.0 | 2.3 | 2.2 |
| Δ H(J/g) | 25 | 65.2 | — |
| Tm(° C.) | 81 | 159 | — |
| Tc(° C.) | 45 | 105 | — |

Example 1

The following additives were blended with the foregoing propylene polymer (P1), and the blend was granulated into pellets by extruding from a single-screw extruder (TLC35-20 Model produced by Tsukada Juki Seisakusho Co., Ltd.).

Additive Prescription (a) Phenol-based Anti-oxidant

Irganox 1010 available from Ciba Specialty Chemicals Corp.: 500 ppm.

(b) Phosphorus-based Anti-oxidant

Irgaphos 168 available from Ciba Specialty Chemicals Corp.: 1,000 ppm.

Mixed pellets were prepared by blending 70 mass % of the foregoing pellets P1 and 30 mass % of IDEMITSU PP F-704NP (referred to as B1 below) available from Idemitsu Petrochemical Co., Ltd. The mixed pellets were formed into sheet using a calendering apparatus (twin 3-inch rollers) produced by NISHIMURA Co., Ltd. under the conditions of a heating roller temperature of 180° C., a cooling roller temperature of 60° C., and a take-off speed of 40 m/second. The results of evaluation according to the following "Evaluation method of a calender molded article" are shown in Table 2.

"Evaluation Method of a Calender Molded Article"

(1) Tensile Elastic Modulus

The tensile elastic modulus was determined in accordance with the tensile test of JIS K-7127 under the following conditions:

(a) Crosshead speed: 50 mm/minute (b) Load cell: 100 kg (c) Measurement direction: Machine direction (MD direction)

(2) Transparency

The transparency of the molded article was evaluated with visual observation and classified in accordance with the following criteria:

A: extremely transparent,

B: transparent

C: blooming is a little intense, and

D: blooming is intense (3) Forming Ability

The forming ability is evaluated with surface condition and classified in accordance with the following criteria:

A: extremely smooth,

B: smooth,

C: a little shark skin-like, and

D: intensely shark skin-like.

(4) Sticking Feel

Touched by hand, the sticking feel of the molded article was evaluated by the touch and classified in accordance with the following criteria:

A: without sticking at all,

B: with little sticking,

C: with much sticking, and

D: with intense sticking.

Example 2

EXAMPLE 2 was conducted as EXAMPLE 6 with the exception of using IDEMITSU PP F-744N (referred to as B2 below) available from Idemitsu Petrochemical Co., Ltd. instead of B1 in EXAMPLE 1, and with the exception of settling the heating roller temperature at 160° C. in EXAMPLE 1. The results are shown in Table 2.

Example 3

EXAMPLE 3 was conducted as EXAMPLE 7 with the exception of changing the amount of pellet P1 to 50 mass % in EXAMPLE 2, and with the exception of changing the amount of B2 to 50 mass % in EXAMPLE 2. The results are shown in Table 2.

Example 4

EXAMPLE 4 was conducted as EXAMPLE 1 with the exception of changing the amount of pellet P1 to 50 mass %, with the exception of using Affinity PL1880 (refered to as B3 below) available from Dow chemical Japan Co., Ltd. instead of B1, and with the exception of settling the heating roller temperature to 130° C. The results are shown in Table 2.

Comparative Example 1

COMPARATIVE EXAMPLE 1 was conducted as EXAMPLE 1 with the exception of using pellet P2 instead of pellet P1. The results are shown in Table 2.

Comparative Example 2

COMPARATIVE EXAMPLE 2 was conducted as EXAMPLE 1 with the exception of using the foregoing propylene polymer P3 instead of P1. The results are shown in Table 2.

Example 5

Prescribing additives to the propylene polymer (P1) similarly as EXAMPLE 1, the blend was granulated into pellets by extruding from the single-screw extruder.

(a) Blending 70 mass % of pellet of P1 and 30 mass % of IDEMITSU PP F-704NP (referred to as B1 below) available from Idemitsu Petrochemical Co., Ltd., the pellets were formed into polyolefin sheet with the thickness of 300 μm by melt-kneading by the use of a calendering apparatus having twin rollers produced by Nishimura Co., Ltd. A molded article for a leather tone product (specimen: 1 mm in thickness) for polyolefin resin evaluation was prepared by press molding (press temperature: 230° C., pressing force: 50 kg/cm$^2$, cooling temperature: 30° C.) the polyolefin sheet by means of a press molding machine (YS-10 type, produced by from Shindo Metal Industry Co., Ltd.). The results of evaluation with regards to tensile elastic modulus and haze in accordance with the following "Evaluation method" are shown in Table 3.

(b) After applying a polyurethane solution CRISVON NY-333 (available from Dainippon Ink & Chemicals, Inc.) to a release coated paper (available from Asahi roll Co., Ltd.) with a knife coater with the regulation of coating quantity to obtain a film thickness of 30 μm after drying, it was dried. Then, a polyurethane film was obtained by applying AS-358 (available from Dainippon Ink & Chemicals, Inc.) as an adhesive on the surface of the film.

(c) By laminating (b) polyurethane film onto (a) polyolefin sheet using dry-laminate method and after aging it for a long time, a material for leather tone product was obtained by separating the release coated paper. The results of evaluation regarding the obtained material for leather tone product in accordance with the following "Evaluation method" are shown in Table 3.

"Evaluation Method"

(1) Tensile Elastic Modulus

The tensile elastic modulus of the press specimen of polyolefin resin for leather tone product was measured according to tensile test of JIS K-7113 under the following conditions:

TABLE 2

| | | EX. 1 | EX. 2 | EX. 3 | EX. 4 | COM. EX. 1 | COM. EX. 2 |
|---|---|---|---|---|---|---|---|
| Component [I] | P1 (mass %) | 70 | 70 | 50 | 50 | — | — |
| | P2 (mass %) | — | — | — | — | 70 | — |
| | P3 (mass %) | — | — | — | — | — | 70 |
| Component [II] | B1 (mass %) | 30 | — | — | — | 30 | 30 |
| | B2 (mass %) | — | 30 | 50 | — | — | — |
| | B3 (mass %) | — | — | — | 50 | — | — |
| Results of Evaluation | Tensile elastic modulus (Mpa) | 100 | 80 | 220 | 40 | 560 | 80 |
| | Feel | A | A | B | A | D | A |
| | Transparency | A | A | A | A | C | C |
| | Molding Ability | A | A | A | B | D | C |
| | Sticking | A | A | A | B | A | C |
| | Total Evaluation | A | A | B | B | D | C |
| | Comments | U | U | V | V | W | X |

Notes:
In Table 2, "EX." is an abbreviation of EXAMPLE and "COM." is an abbreviation of COMPARATIVE. In addition, "U" means extremely favorable in total, "V" means favorable in total, "W" means that the method is not practical because it is poor in flexibility and the surface is intensely shark skin-like in total, and "X" means not sufficient because the surface is a little shark skin-like and with much sticking in total.

Crosshead speed: 50 mm/minute
Load cell: 100 kg
Measurement direction: Machine direction (MD direction)
(2) Haze
The haze of the press specimen of the polyolefin resin for leather tone product was measured in accordance with JIS K-7105. The smaller the haze, the clearer the transparency of the press specimen.
(3) Sticking Performance
Sticking performance was evaluated by feeling of an evaluator touching the material for leather tone product by his hand and classified in accordance with the following criteria:
A: without sticking at all,
B: with little sticking, and
C: with intense sticking.
(4) Texture
Texture was evaluated by feeling of an evaluator touching the material for leather tone product by his hand and classified in accordance with the following criteria:

A: flexible and having texture of leather tone,
B: poor in flexibility, but having texture of leather tone, and
C: lacking flexibility and loosing texture of leather tone.

Example 6

EXAMPLE 6 was conducted as EXAMPLE 1 with the exception of using IDEMITSU PP F-744NP (referred to as B2 below) available from Idemitsu Petrochemical Co., Ltd., instead of B1 in EXAMPLE 5. The results are shown in Table 3.

Example 7

EXAMPLE 7 was conducted as EXAMPLE 1 with the exception of changing the amount of P1 to 50 mass % in EXAMPLE 6, and with the exception of changing the amount of B2 to 50 mass % in EXAMPLE 6. The results are shown in Table 3.

Example 8

EXAMPLE 8 was conducted as EXAMPLE 3 with the exception of using Affinity PL 1880 (referred to as B3 below) available from Dow chemical Japan Co., Ltd. instead of B2 in EXAMPLE 7. The results are shown in Table 3.

Comparative Example 3

COMPARATIVE EXAMPLE 3 was conducted as EXAMPLE 5 with the exception of using pellet of P2 instead of pellet of P1. The results are shown in Table 3.

Comparative Example 4

COMPARATIVE EXAMPLE 4 was conducted as Example 1 with the exception of changing P1 in the production of the material for polyolefin series leather tone product of EXAMPLE 5 into 50 mass % of the foregoing P3 and changing the ratio of B1 into 50 mass %. The results are shown in Table 3.

TABLE 3

|  |  | EX. 5 | EX. 6 | EX. 7 | EX. 8 | COM. EX. 3 | COM. EX. 4 |
| --- | --- | --- | --- | --- | --- | --- | --- |
| Component [I] | P1 (mass %) | 70 | 50 | 50 | 50 | — | — |
|  | P2 (mass %) | — | — | — | — | 70 | — |
|  | P3 (mass %) | — | — | — | — | — | 50 |
| Component [II] | B1 (mass %) | 30 | — | — | — | 30 | 50 |
|  | B2 (mass %) | — | 30 | 50 | — | — | — |
|  | B3 (mass %) | — | — | — | 50 | — | — |
| Results of Evaluation | Tensile elastic modulus (Mpa) | 120 | 105 | 200 | 62 | 520 | 80 |
|  | Haze (%) | 9.5 | 7.0 | 23 | 33 | 60 | 60 |
|  | Sticking | A | A | A | B | B | C |
|  | Texture | A | A | B | A | C | A |
|  | Total Evaluation | A | A | B | B | C | C |
|  | Comments | U | U | V | V | X | Y |

Notes:
In Table 3, "EX." is an abbreviation of EXAMPLE and "COM." is an abbreviation of COMPARATIVE. Additionally, "U" means extremely favorable in total, "V" means favorable in total, "X" means not sufficient in transparency and in texture in total, and "Y" means not sufficient in transparency and in sticking in total.

Example 9

A Leather Tone Product (i) A laminated sheet was obtained by laminating the polyolefin sheet in (a) of EXAMPLE 5 onto a knitted goods of a polyester/rayon mixed fiber as a substrate via AS-358 (available from Dainippon Ink & Chemicals, Inc.) as an adhesive layer.

(ii) A surface coating agent including fine powder of silk was prepared by blending fine powder of silk having average particle diameter of 5 $\mu$m into a mixed solution of MMAT780 and TOP 701M(both available from Dainippon Ink & Chemicals, Inc) up to 10% by weight as against solid content quantity in the polyurethane solution, and by agitating until they are dispersed homogeneously in the solution.

(iii) After applying CRISVON NY-333 (available from Dainippon Ink & Chemicals, Inc.) to a release coated paper (available from Asahi roll Co., Ltd.) with a knife coater with the regulation of coating quantity to obtain a film thickness of 30 $\mu$m after drying, it was dried. Then, a polyurethane film was obtained by applying AS-358 (available from by Dainippon Ink & Chemicals, Inc.) as an adhesive on the surface of the film.

(iv) By laminating the foregoing polyurethane film onto the foregoing laminated sheet using dry-laminate method and after aging it for a long time, a new laminated sheet was obtained by separating the release coated paper. A leather tone product was obtained by applying the foregoing surface coating agent twice onto the surface of the new laminated sheet with gravure coating method. A version of 120 mesh was employed as the gravure roll. Evaluation of "texture" was conducted in the same way as EXAMPLE 1 and favorable results were obtained.

Industrial Applicability

According to the resin composition of the present invention, a resin composition for calender formation, a molded article by the use of the resin composition, a material for polyolefin-based leather tone product and a leather tone product being superior in molding ability, being easy for recycling, being environmentally friendly with little fear of generating toxic gas in the disposal and incineration, with little sticking and being superior in transparency and texture are provided.

What is claimed is:

1. A resin composition comprising [I] a propylene polymer in an amount of 1 to 99 mass %, and [II] an olefin-based polymer in an amount of 99 to 1 mass %, wherein the propylene polymer has a meso pentad fraction (mmmm) of from 0.2 to 0.6; and a racemic pentad fraction (rrrr) and (1−mmmm) relation of $$[rrrr/(1-mmmm)] \leq 0.1,$$

wherein the meso pentad fraction (mmmm) and a racemic pentad fraction (rrrr) are determined from the $^{13}C$ NMR spectrum.

2. The resin composition according to claim 1, wherein the propylene polymer has an intrinsic viscosity [η] measured at 135° C. in tetralin of from 1.0 to 3.0 deciliter/g.

3. The resin composition according to claim 1, wherein the propylene polymer has an amount of a component which is eluted at 25° C. or lower through temperature rise chromatography (W 25) of from 20 to 100 mass %.

4. The resin composition according to claim 1, wherein the propylene polymer is obtained by polymerizing at least propylene in the presence of a metallocene catalyst comprising a promoter and a transition metallic compound having a cross-linking structure via two cross-linking groups.

5. A resin composition for calender formation comprising the resin composition according to claim 1.

6. A molded article obtained by calender molding the resin composition according to claim 5.

7. A material for a polyolefin leather tone product comprising a polyolefin resin layer comprising the resin composition for calender formation according to claim 1.

8. A leather tone product obtained by laminating the material for polyolefin-based leather tone product according to claim 7 on a substrate.

9. A leather tone product obtained by laminating the material according to claim 7 on a substrate.

10. The resin composition according to claim 1, wherein the propylene polymer has a molecular weight distribution Mw/Mn of 4.0 or less as measured by gel permeation chromatography.

11. The resin composition according to claim 1, wherein the heat of melting obtained by differential scanning calimetry of the polypropylene polymer is 30 J/g or less.

12. The resin composition of claim 1, having a melting point of 100° C. or lower.

13. The resin composition of claim 1, wherein the propylene polymer has a tensile elastic modulus of 100 MPa or less.

14. The resin composition of claim 1, wherein the propylene polymer has a tensile elastic modulus of 70 MPa or less.

15. The resin composition of claim 1, wherein the propylene polymer comprises polymerized units of propylene and at least one comonomer selected from the group consisting of ethylene, 1-butene, 1-pentene, 4-methyl-1-pentene, 1-hexene, 1-octene, 1-decene, 1-dodecene, 1-tetradecene, 1-hexadecene, 1-octadecene, and 1-icocene.

16. The resin composition as claimed in claim 1, wherein the meso pentad fraction (mmmm) is from 0.3 to 0.6.

17. The resin composition of claim 1, wherein the meso pentad fraction (mmmm) is from 0.4 to 0.5.

18. The resin composition of claim 1, wherein [rrrr/(1−mmmm)]≦0.06.

19. The resin composition of claim 1, wherein [rrrr/(1−mmmm)]≦0.05.

20. The resin composition of claim 1, wherein the propylene polymer has an intrinsic viscosity [η] measured at 135° C. in tetralin of from 1.0 to 2.5 deciliter/g.

21. The resin composition of claim 1, wherein the intrinsic viscosity [η] measured 135° C. in tetraline is from 1.0 to 2.2 deciliter/g.

22. The resin composition of claim 1, wherein the propylene polymer has an amount of a component which is eluded at 25° C. or lower through temperature rise chromatography (W 25) of from 50 to 100 mass %.

23. The resin composition of claim 1, wherein the propylene polymer has an amount of a component which is eluded at 25° C. or lower through temperature rise chromatography (W 25) of from 60 to 100 mass %.

24. The resin composition of claim 1, wherein the propylene polymer is present in an amount of from 25 to 75 mass % and the olefin-based polymer is present in an amount of from 75 to 25 mass %.

25. The resin composition of claim 1, wherein the propylene polymer is present in an amount of from 40 to 75 mass % and the olefin-based polymer is present in amount of 60 to 25 mass %.

26. The resin composition of claim 1, wherein the olefin-based polymer is at least one selected from the group consisting of polypropylene, propylene-ethylene copolymer, propylene-ethylene-diene copolymer, polyethylene, ethylene/α-olefin copolymer, ethylene-vinylacetate copolymer, and hydrogenated styrene-based elastomer.

* * * * *

UNITED STATES PATENT AND TRADEMARK OFFICE
CERTIFICATE OF CORRECTION

PATENT NO. : 6,784,250 B2
DATED : August 31, 2004
INVENTOR(S) : Kijima

It is certified that error appears in the above-identified patent and that said Letters Patent is hereby corrected as shown below:

Title page,
The Terminal Disclaimer information has been omitted. Item [45] and the Notice information should read as follows:
-- [45] **Date of Patent: \*Aug. 31, 2004**
[\*] Notice: Subject to any disclaimer, the term of this
patent is extended or adjusted under 35
U.S.C. 154(b) by 0 days.

This Patent is subject to a terminal disclaimer --

Signed and Sealed this

Seventh Day of June, 2005

JON W. DUDAS
*Director of the United States Patent and Trademark Office*